United States Patent
Saint-Paul et al.

(10) Patent No.: US 12,182,802 B1
(45) Date of Patent: Dec. 31, 2024

(54) ORCHESTRATION OF CURRENCY CONVERSION OPTIMIZATION

(71) Applicant: Amadeus S.A.S., Biot (FR)

(72) Inventors: Jean Fritz Saint-Paul, Antibes (FR); Beatrice Bouju, London (GB); Miarintsoa Ramanantsimiavona, Peymeinade (FR); Asmae Ghalmi, Antibes (FR); Anthony Saint-Gilles, Antibes (FR); Yang Tai, Antibes (FR)

(73) Assignee: Amadeus S.A.S., Biot (FR)

( * ) Notice: Subject to any disclaimer, the term of this patent is extended or adjusted under 35 U.S.C. 154(b) by 0 days.

(21) Appl. No.: 17/940,410

(22) Filed: Sep. 8, 2022

Related U.S. Application Data

(63) Continuation of application No. 17/552,706, filed on Dec. 16, 2021, now abandoned.

(51) Int. Cl.
G06Q 20/00 (2012.01)
G06Q 20/12 (2012.01)
G06Q 20/38 (2012.01)
G06Q 20/40 (2012.01)
G06Q 10/02 (2012.01)

(52) U.S. Cl.
CPC ........... *G06Q 20/381* (2013.01); *G06Q 20/12* (2013.01); *G06Q 20/4016* (2013.01); *G06Q 10/02* (2013.01)

(58) Field of Classification Search
USPC ......................................................... 705/44
See application file for complete search history.

(56) References Cited

U.S. PATENT DOCUMENTS

| | | | |
|---|---|---|---|
| 7,660,768 B2 * | 2/2010 | Beck ...................... | G06Q 20/40 235/380 |
| 7,747,475 B1 | 6/2010 | Bowman et al. | |
| 8,626,660 B2 | 1/2014 | Beck et al. | |

(Continued)

FOREIGN PATENT DOCUMENTS

| | | | | |
|---|---|---|---|---|
| EP | 3244361 A1 | 11/2017 | | |
| WO | WO-2019119478 A1 * | 6/2019 | ............. | G06N 3/126 |

OTHER PUBLICATIONS

Authors: A.V. Prasolovo; Title : On forecast of exchange rate of a foreign currency; Date Added to IEEE Xplore: Aug. 6, 2002 (Year: 2002).*

(Continued)

*Primary Examiner* — Bruce I Ebersman
*Assistant Examiner* — Hatem M Ali
(74) *Attorney, Agent, or Firm* — Thompson Hine LLP

(57) ABSTRACT

Methods, systems, and computer program products for implementing currency conversion and foreign exchange processes for an exchange payment platform system. An offer look-up request for an offer associated with a booking event is received. The offer look-up request including a first currency, a second currency, and a transaction context information. A foreign exchange rate request including the offer look-up request is provided to a foreign exchange server. A converted offer associated with a proposed foreign exchange rate is received from the foreign exchange server. A payment webpage including the converted offer is provided to the merchant. The converted offer is presented in a standard format based on formatting rules associated with the merchant.

18 Claims, 6 Drawing Sheets

(56) References Cited

U.S. PATENT DOCUMENTS

| | | | |
|---|---|---|---|
| 2004/0148255 | A1 | 7/2004 | Beck et al. |
| 2010/0145744 | A1 | 6/2010 | Beck et al. |
| 2013/0282580 | A1 | 10/2013 | O'Brien et al. |
| 2014/0164155 | A1 | 6/2014 | Nicholls et al. |
| 2016/0132965 | A1 | 5/2016 | Malhotra et al. |
| 2017/0213219 | A1* | 7/2017 | Garden .............. G06Q 20/4016 |
| 2018/0189829 | A1* | 7/2018 | Patwardhan ....... G06Q 20/3678 |
| 2020/0082406 | A1 | 3/2020 | Timko et al. |
| 2020/0111084 | A1 | 4/2020 | Ward et al. |
| 2020/0327539 | A1 | 10/2020 | Andrew et al. |
| 2021/0042735 | A1 | 2/2021 | Majidi et al. |
| 2021/0097529 | A1 | 4/2021 | O'Sullivan et al. |
| 2021/0216998 | A1 | 7/2021 | Wadhwa et al. |
| 2022/0277276 | A1 | 9/2022 | Madhavan et al. |

OTHER PUBLICATIONS

Authors: Xinyi Ruan ; Title: Currency Market Portfolio Constructions Based on Purchasing Power Parity Strategy and Refinement; IEEE Xplore; Publication Date: Apr. 1, 2021 (Year: 2021).*

Authors: J Christopher Westland et al; Title: Secure Digital Payment. Publisher: MIT Press. Copyright Year:1999 (Year: 1999).*

Authors: Hema Pellivada et al; Title: Blockchain based Decentralized Vehicle Booking Service; Publisher: IEEE; Date of Conference: Oct. 7-9, 2021 (Year: 2021).*

Authors: A.V. Prasolovo; Title : On forecast of exchange rate of a foreign currency; Date Added to IEEE Xplore: Aug. 6, 2002 (Year: 2002) (Year: 2002).*

Jean Fritz Saint-Paul et al., "Orchestration of Foreign Exchange Optimization" filed on Sep. 8, 2022 as a U.S. Appl. No. 17/940,412.

U.S. Patent and Trademark Office; Non-Final Office Action issued in U.S. Appl. No. 17/940,412 on Nov. 25, 2022, 19 pages.

U.S. Patent and Trademark Office; Final Office Action issued in U.S. Appl. No. 17/940,412 on Feb. 22, 2023, 18 pages.

U.S. Patent and Trademark Office; Non-Final Office Action issued in U.S. Appl. No. 17/940,412 on Jul. 13, 2023, 9 pages.

U.S. Patent and Trademark Office; Final Office Action issued in U.S. Appl. No. 17/940,412 on Apr. 28, 2023, 9 pages.

U.S. Patent and Trademark Office; Final Office Action issued in U.S. Appl. No. 17/940,412 on Apr. 28, 2023, 18 pages.

U.S. Patent and Trademark Office; Non-Final Office Action issued in U.S. Appl. No. 17/940,412 on Feb. 1, 2024; 12 pages.

U.S. Patent and Trademark Office, Final Office Action issued in U.S. Appl. No. 17/940,412 on Jul. 10, 2024; 15 pages.

* cited by examiner

ORCHESTRATION OF CURRENCY CONVERSION OPTIMIZATION

TECHNICAL FIELD

The present invention generally relates to computers and computer software, and more specifically, to methods, systems, and computer program products for implementing foreign exchange and currency conversion optimization processes.

BACKGROUND

Merchants seek consultative tools and payment processes to better optimize their business practices and evaluate the potential risks of end-to-end payment solutions for their global business. Foreign exchange is an integral part of a payment solution process for a global business because of the complexities involved with multiple entities. Additionally, foreign exchanges are often not actively managed, as merchants typically must rely on their particular foreign exchange provider (e.g., a bank) and accept the rate they are provided. Moreover, in a typical foreign exchange process with a merchant, customer, and foreign exchange provider, managing accurate foreign exchange rates is important to deliver the right customer experience. For example, a customer may be quoted an initial price to buy a particular item (e.g., a travel ticket), but when that item is actually invoiced by the customer's bank (e.g., at a different foreign exchange rate), the customer may be paying more than they were initially quoted when they made the purchase. Thus, there is a need to provide merchants with the ability to provide their customers with an offer price that matches the final payment price after the foreign exchange rate(s) are accounted for in the payment processes.

SUMMARY

In embodiments of the invention, a method for implementing an orchestration of currency conversion optimization process. The method includes receiving, at a currency orchestrator from a merchant, an offer look-up request for an offer associated with a booking event, the offer look-up request including a first currency, a second currency, and a transaction context information. The method further includes providing, by the currency orchestrator, a foreign exchange rate request including the offer look-up request to a foreign exchange server. The method further includes selecting a rate provider from among the plurality of rate providers to which the foreign exchange server is connected. The method further includes receiving, at the currency orchestrator from the foreign exchange server, a converted offer associated with a proposed foreign exchange rate from the selected rate provider. The method further includes providing, to the merchant by the currency orchestrator, a payment webpage including the converted offer, where the converted offer is presented in a standard format based on formatting rules associated with the merchant.

These and other embodiments can each optionally include one or more of the following features.

In some embodiments of the invention, the method further includes receiving, at the currency orchestrator from the merchant, a payment notification including payment transaction data that includes a transaction identification and a method of payment, wherein the payment notification is generated by the merchant based on an acceptance of the converted offer at a client device, and in response to receiving the payment notification, processing a payment associated with the payment notification with a payment service provider, and providing, to the merchant, a payment confirmation and a ticket associated with the booking event.

In some embodiments of the invention, processing the payment with the payment service provider includes accessing, via a fraud database, fraud verification information associated with the transaction identification, and verifying that payment transaction data associated with the payment notification is not fraudulent.

In some embodiments of the invention, processing the payment with the payment service provider includes determining that authorization of payment associated with payment transaction data associated with the payment notification is successful, determining that an authorization associated with the payment transaction data is valid based on an authorization time stamp, determining that there is not an attempted follow-up operation or a pending follow-up operation associated with the payment transaction data, determining that an amount and currency of payment associated with the payment transaction data is available, and/or determining that a first payment instrument associated with the payment transaction data matches a second payment instrument associated with the travel record data.

In some embodiments of the invention, processing the payment with the payment service provider includes storing data associated with the converted offer in a sales record associated with the booking event.

In some embodiments of the invention, the data associated with the converted offer is stored with a specific permission access scheme within the sales record.

In some embodiments of the invention, processing the payment with the payment service provider includes capturing, during a capture time period, the payment from the payment service provider based on a converted currency rate, wherein the converted currency rate is received from a foreign exchange rate provider at the capture time period.

In some embodiments of the invention, the method further includes storing the proposed foreign exchange rate as an historical rate associated with the transaction at an offer proposal time, and determining whether to issue a refund based on a comparison between the historical rate and another rate associated with the payment at a payment transaction time.

In some embodiments of the invention, in response to receiving the foreign exchange rate request from the currency orchestrator, the foreign exchange server is configured to access a plurality of rate providers based on the foreign exchange rate request to determine the proposed foreign exchange rate, determine a context of a transaction of the foreign exchange rate request based on a plurality of parameters associated with the foreign exchange rate request, and determine, based on the context of the transaction and attributes associated with the transaction context information, the converted offer associated with the proposed foreign exchange rate of the selected rate provider. The rate provider is selected by the foreign exchange server based on the context of the transaction and the attributes associated with the transaction context information.

In some embodiments of the invention, the method further comprises providing, by the currency orchestrator, a capture notification to the foreign exchange server, and the foreign exchange server, in response to receiving the capture notification, is further configured to determine a foreign exchange profit analysis for the merchant associated with the foreign exchange rate request, wherein the foreign exchange profit analysis is based on a ticket aggregation process. The ticket aggregation process may be based on received notifications, and each notification is referenced using a ticket number, a booking reference, and a payment reference.

In some embodiments of the invention, the method further includes providing, by the currency orchestrator, a capture notification to the foreign exchange server, wherein the foreign exchange server, in response to receiving the capture notification, is further configured to determine a foreign exchange profit analysis for a merchant associated with the foreign exchange rate request, wherein the foreign exchange profit analysis is based on a ticket aggregation process, a trade netting process, a trade optimization process, or a combination thereof.

In some embodiments of the invention, the foreign exchange server is further configured to determine, based on the foreign exchange profit analysis, a trading report associated with a date of the transaction, a ticket level profit calculation associated with the merchant, and a reconciliation calculation.

In some embodiments of the invention, the foreign exchange server is further configured to provide a foreign exchange report to the merchant, and the foreign exchange report includes the trading report associated with the date of the transaction, the ticket level profit calculation associated with the merchant, and the reconciliation calculation.

In some embodiments of the invention, the plurality of parameters are received from a merchant associated with the foreign exchange rate request or the currency orchestrator. In some embodiments of the invention, the plurality of parameters associated with the foreign exchange rate request include booking parameters. In some embodiments of the invention, the plurality of parameters associated with the foreign exchange rate request include currency parameters and/or localization parameters.

In embodiments of the invention, a computing apparatus for implementing an orchestration of currency conversion optimization process. The computing apparatus includes one or more processors, at least one memory device coupled with the one or more processors, and a data communications interface operably associated with the one or more processors. The at least one memory device contains a plurality of program instructions that, when executed by the one or more processors, cause the including apparatus to perform operations. The operations include receive, at a currency orchestrator from a merchant, an offer look-up request for an offer associated with a booking event, the offer look-up request including a first currency, a second currency, and a transaction context information. The operations further include provide, by the currency orchestrator, a foreign exchange rate request including the offer look-up request to a foreign exchange server. The operations further include select a rate provider from among a plurality of rate providers to which the foreign exchange server is connected. The operations further include receive, at the currency orchestrator from the foreign exchange server, a converted offer associated with a proposed foreign exchange rate from the selected rate provider. The operations further include provide, to the merchant by the currency orchestrator, a payment webpage including the converted offer, where the converted offer is presented in a standard format based on formatting rules associated with the merchant.

In embodiments of the invention, a non-transitory computer storage medium encoded with a computer program, the computer program including a plurality of program instructions that when executed by one or more processors cause the one or more processors to perform operations. The operations include receive, at a currency orchestrator from a merchant, an offer look-up request for an offer associated with a booking event, the offer look-up request including a first currency, a second currency, and a transaction context information. The operations further include provide, by the currency orchestrator, a foreign exchange rate request including the offer look-up request to a foreign exchange server. The operations further include select a rate provider from among a plurality of rate providers to which the foreign exchange server is connected. The operations further include receive, at the currency orchestrator from the foreign exchange server, a converted offer associated with a proposed foreign exchange rate from the selected rate provider. The operations further include provide, to the merchant by the currency orchestrator, a payment webpage including the converted offer, where the converted offer is presented in a standard format based on formatting rules associated with the merchant.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
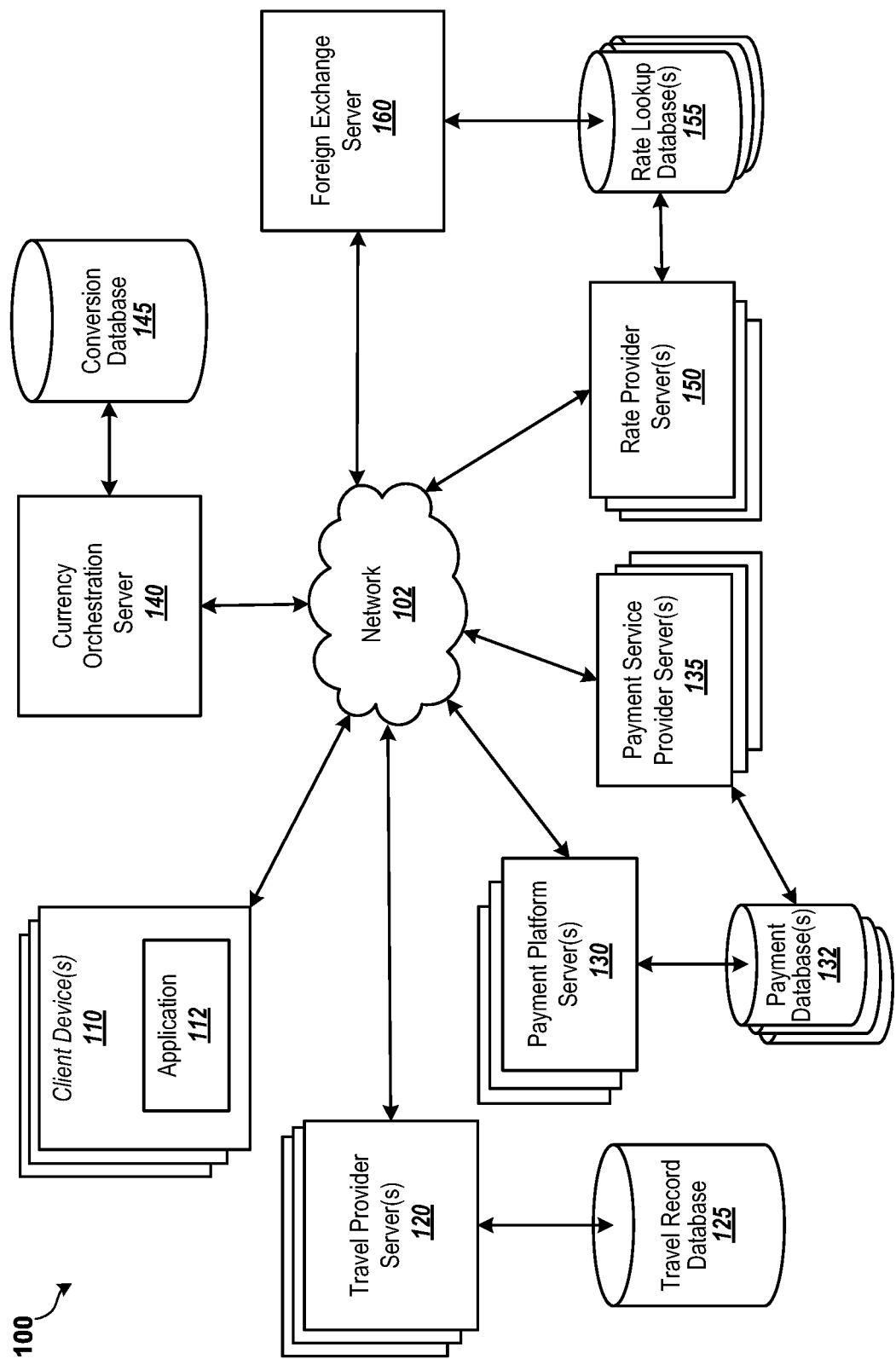
FIG. 1 illustrates an environment for implementing currency conversion and foreign exchange processes, according to embodiments of the invention.

The technology in this patent application is related to systems and methods for implementing a currency conversion process and a foreign exchange process as features in an exchange payment platform system. Merchants seek consultative tools and payment processes to better optimize their business practices and evaluate the potential risks of end-to-end payment solutions for their global business.

Foreign exchange is an integral part of a payment solution process for a global business because of the complexities involved with multiple entities. Additionally, foreign exchanges are often not actively managed, as merchants typically must rely on their particular foreign exchange provider (e.g., a bank) and accept the rate they are provided. Moreover, in a typical foreign exchange process with a merchant, customer, and foreign exchange provider, managing accurate foreign exchange rates is important to deliver the right customer experience. For example, a customer may be quoted an initial price to buy a particular item (e.g., a travel ticket), but when that item is actually invoiced by the customer's bank (e.g., at a different foreign exchange rate), the customer may be paying more than they were initially quoted when they made the purchase. Thus, there is a need to provide merchants with the ability to provide their customers with an offer price that matches the final payment price after the foreign exchange rate(s) are accounted for in the payment processes.

The currency conversion process includes a currency instruction set (e.g., a currency orchestrator) that enables merchants (e.g., travel merchants such as airlines) to manage the retail foreign exchange on their cross-currency payments in an industry applicable, fully automated manner. Additionally, the currency conversion process enables merchants to internalize the foreign exchange spread according to their own criteria. The currency conversion process further enables merchants to reconcile cross-currency payments in an automated way as the currency orchestrator can be configured to the standards of the applicable industry (e.g., modern touchpoints, frictionless flows, removing intermediaries, and the like) while the back-office processing remains unaffected. One or more features of the conversion process, as described herein, may include: rate provider routing of transactions, combining foreign exchange rates within common records (e.g., a passenger name record (PNR)), identification information (e.g., a currency pair such as an internal merchant identification and customer data), currency spreads, format offers to established transaction standards, routes transactions to the payment provider(s) (e.g., banks, etc.), processes authorization in the converted currency, and refunds may be enabled based on the historical rate. Additionally, at the sales record level (e.g., the ticket level for a travel merchant), conversion information may be stored and/or displayed, currency accounts may be split, capture of converted currency may be managed, and both conversion and payment information can be retained.

More specifically, this technology includes a currency orchestration process (e.g., currency conversion) that receives, at a currency orchestrator from a merchant, an offer look-up request for an offer associated with a booking event. The offer look-up request includes a first currency (e.g., the currency received), a second currency (e.g., a requested currency to be converted), and a transaction context information (e.g., a method of payment, i.e., credit card, an online stored value payment system, etc.). A foreign exchange rate request including the offer look-up request is provided by the currency orchestrator to a foreign exchange server. A converted offer associated with a proposed foreign exchange rate is received at the currency orchestrator from the foreign exchange server. A payment webpage including the converted offer is provided to the merchant by the currency orchestrator. The converted offer is presented in a standard format based on formatting rules associated with the merchant. For example, a new ticket may be formatted in a standard format to disclose particular information to the customer.

The foreign exchange process includes a foreign exchange instruction set (e.g., a foreign exchange services module) that provides dedicated foreign exchange services to the currency conversion process. The touchpoints of the foreign exchange process improve access to foreign exchange rate providers. Additionally, the foreign exchange process can allow merchants to maximize their own foreign exchange revenues and deliver an improved user experience for a global customer that merchants desire by providing and maintaining localized pricing (e.g., a traveler booking an international ticket that includes foreign exchange). One or more features of the foreign exchange process, as described herein, may include: seamless access to leading foreign exchange providers, pricing and trading may be managed, context is provided for a specific foreign exchange offer, currency is combined with payment, allows merchant to manage margins, foreign exchange rates for market events can be monitored, and the foreign exchange provider can be updated on current foreign exchange positions (e.g., risk exposure management). At the ticket level, costs may be aggregated, and the foreign exchange rate can be calculated and provided to the end user. Additionally, the foreign exchange process can meet local shopping patterns, provide a user interface with rounding algorithms, optimize and consolidate foreign exchange trades sent to a foreign exchange provider, generate a foreign exchange trading report with value date, and reconcile ticket and customer currencies.

More specifically, this technology includes a foreign exchange process that receives, at a foreign exchange server from a currency orchestrator, a foreign exchange rate request including an offer look-up request, a first currency (e.g., the currency received), and a second currency (e.g., a requested currency to be converted). The offer look-up request may include a transaction context information (e.g., a method of payment, i.e., credit card, an online stored value payment system, etc.). Additionally, or alternatively, the offer look-up request can include the payment instrument as the transaction context information, but also additional transaction context information related to the industry being served. For example, in the travel industry, the transaction context information may include market and/or geographical location attached to the look-up request. A plurality of rate providers are accessed based on the foreign exchange rate request to determine a proposed foreign exchange rate (e.g., accessing multiple foreign exchange providers, the offered foreign exchange rate is stored as the historical rate at the time of the offer in case refund is warranted later). A context of a transaction of the foreign exchange rate request is determined based on plurality of parameters such as booking parameters (e.g., a class of the tickets, origin and destination information, profile information of the passenger, etc.). Additionally, a context of a transaction of the foreign exchange rate request is determined based on additional parameters, such as currency parameters and/or localization parameters associated with the foreign exchange rate request (e.g., merchants may have a particular margin in different currencies and/or countries). A converted offer associated with the proposed foreign exchange rate is determined at the foreign exchange server and based on the context of the transaction and attributes associated with the transaction context information (e.g., the converted offer may further be rounded by rounding algorithm). The converted offer associated with the proposed foreign exchange rate is provided to the currency orchestrator by the foreign exchange server.

Although the examples provided herein reference the travel industry, the currency conversion and foreign exchange processes described may be applied to any foreign exchange and payment management system.

FIG. 1 is an example environment 100 for implementing currency conversion and foreign exchange processes, according to embodiments of the invention. The example environment 100 includes one or more client device(s) 110, one or more travel provider server(s) 120, one or more payment platform server(s) 130, one or more payment service provider server(s) 135, one or more currency orchestration server(s) 140, one or more rate provider server(s) 150, and one or more foreign exchange server(s) 160, that communicate over a data communication network 102, e.g., a local area network (LAN), a wide area network (WAN), the Internet, a mobile network, or a combination thereof.

The one or more client device(s) 110 (e.g., a device used by a requestor) can include a desktop, a laptop, a server, or a mobile device, such as a smartphone, tablet computer, wearable device (e.g., smartwatch), in-car computing device, and/or other types of mobile devices. Additionally, the one or more client device(s) 110 may be public uses devices such as a kiosk, a user terminal, and the like. The one or more client device(s) 110 includes applications, such as the application 112, for managing a travel booking request to/from the one or more travel provider server(s) 120. The one or more client device(s) 110 can include other applications. The one or more client device(s) 110 initiates a travel booking request by a requestor via application 112. The travel booking request may include availability search queries by requesting entities (such as clients, applications, browsers installed on user terminals, etc.) in the course of a search (e.g., airline booking search). The one or more client device(s) 110 may be utilized by a customer to review a reserved travel booking and provide and authenticate payment information for the reserved travel booking. Additionally, a requestor of a travel booking using the one or more client device(s) 110 may include an airline agency, travel agency, other dedicated global distribution systems (GDS), as for example airlines reservation systems which provide flight search applications for shopping business like flight booking, and the like.

The one or more travel provider server(s) 120 (e.g., merchant servers) manages travel booking requests received from application 112 from the one or more client devices 110. The one or more travel provider server(s) 120 may be a personal computing device, tablet computer, thin client terminal, smart phone and/or other such computing device. The one or more travel provider server(s) 120 receives booking data from a client device to reserve a travel reservation and generate a PNR for that particular travel product(s) associated with the booking data. Although a PNR is described as being generated, which is in regard to an example of an airline booking, the systems described herein could further include any other type of order management system for other travel providers, such as hotels, rental cars, etc., capable of generating a record associated with booking data. As such, in general, a reservation application executes on a reservation device (e.g., application 112 on client device 110) to generate a front end through which a travel agent may interface with the travel provider server 120 to reserve a travel booking for a travel customer. For example, a reservation device executing a reservation application may operate as a remote terminal connected to travel provider server 120, and a travel agent may reserve a travel booking for a travel customer by interfacing with the travel provider server 120 using the client device 110. For example, the client device 110 executing the reservation application may provide a command-line interface to a GDS embodied by the travel provider server 120. In this example, the booking data communicated by the client device 110 may be in a travel agency format, such as command-line. Additionally, after a consumer on a client device 110 confirms an issuance for the particular travel product(s) associated with the booking data, a travel provider server 120 initiates a payment process by sending an order request to the one or more travel provider server(s) 120 associated with the requested travel product(s) from the consumer.

The one or more travel provider server(s) 120 (e.g., travel merchants) generally include airlines, rail travel providers, hotels, and/or other such merchants that offer travel or travel-related services to customers using client devices 110. The one or more travel provider server(s) 120 generally facilitate remote communication therewith to reserve travel or travel-related service from a particular travel merchant. After a consumer on a client device 110 confirms an issuance for the particular travel product(s) associated with the booking data, a travel provider server 120 receives an order request from a travel provider server 120 and initiates a payment process by requesting payment from the client device 110. After receiving a payment confirmation for a particular travel booking, a travel provider server 120 may request and receive a travel record ID from a reservation server and send booking confirmation to the client device 110 via the reservation server. Additionally, the one or more travel provider server(s) 120 are configured to initiate currency conversion and foreign exchange processes after receiving a payment confirmation from the one or more payment platform server(s) 130 and payment service provider server(s) 135 and send booking confirmation data by sending a payment request to the currency orchestration server 140.

The one or more travel provider server(s) 120 may be front end server(s) for managing, collecting, processing, and communicating travel records (e.g., travel booking requests, resource information, revenues management data, bookings data, airlines/system configurations data, etc.), that is stored in the travel record database 125. Further, the one or more travel provider server(s) 120 may be front end server(s) for managing, collecting, processing, and communicating payment requests and other payment data from the one or more payment platform server(s) 130 and payment service provider server(s) 135.

The one or more payment platform server(s) 130 manages the payment transactions of travel booking requests received from application 112 between the one or more client devices 110 and the payment service provider server(s) 135. The management protocols of the one or more payment platform server(s) 130 may be based on a redundant load-balancing system by managing multiple clients (e.g., client device(s) 110) so that a payment associated with a travel booking request is handled by one of the one or more payment service provider server(s) 135. For example, there may be multiple payment service provider server(s) 135 that are able to service the travel booking payment, and the redundant load-balancing system of the payment platform server(s) 130 is responsible for ensuring that the travel booking request is performed by one of the capable payment service provider server(s) 135. Payment service providers (e.g., payment processors) include for example, a credit/debit card issuer, a bank, digital payment service, etc., and the one or more servers for each payment service provider generally facilitate remote communication therewith to authenticate and/or authorize a payment via a payment platform server 130 or a payment gateway server. The transaction context data (e.g., payment transaction information) may be stored in one or more payment database(s) 132 associated with each payment processor.

The currency orchestration server 140 receives and processes currency look-up requests and payment requests from a travel provider server 120. The currency orchestration server 140 may include a currency orchestration instruction set that performs a currency conversion optimization protocol according to processes described herein (e.g., process 500 of FIG. 5). An example payment currency orchestration instruction set is further discussed herein with reference to currency orchestration instruction set 345 of FIG. 3.

In some implementations of the invention, the currency orchestration instruction set may include a booking module for handling a booking process from a travel provider server 120. The currency orchestration instruction set further includes a payment processing module for implementing the payment processing scheme between a payment service provider (e.g., payment service provider servers(s) 135) via a payment platform server 130 and a client device 110. In some implementations, the payment request does not include a payment identification. The payment identification may be sent back by the currency orchestration server 140 after the payment request has been made and serves as a key during the full payment process, between the client device 110 and the currency orchestration server 140. The payment identification may be used throughout the payment process and is associated to all payment and travel details, which can be restored from the currency orchestration server 140 at any time. In some implementations, payment identification may not be included in the payment data, as a payment provider does not need payment identification to process a payment. For example, the currency orchestration server 140 can restore the necessary payment data from the payment identification and send this data to a payment provider. Thus, the currency orchestration server 140 can associate the travel record with the payment identification and keep the association during the payment process.

In some implementations of the invention, the currency orchestration instruction set further includes an authentication/authorization module to verify a user making the payment on a client device 110 via a merchant webpage from a travel provider server 120. In an exemplary embodiment of the invention, payment data may be received from the client device 110 at the payment user interface (e.g., via a payment processor), and authentication may be performed of the client device based on the travel record identification by verifying authenticity information from a security database (e.g., payment database 132). Additionally, the authentication/authorization module may perform sanity checks of the transaction context data (e.g., payment transaction information) and the travel record data as a part of an authentication protocol. A fraudulent check, as described herein, may determine whether the transaction is fraudulent, while a sanity check may determine the information is consistent with information in the database(s). For example, the sanity check of the transaction context data and the travel record data may include a record locator consistency check that includes an identification check between the payment identification and the travel record identification (e.g., a record locator (RLOC) consistency check). Additional sanity checks may include merchant matching, authorization approval and whether it was recent based on a time stamp, checking for follow-up or pending operations, confirming amount and currency of payment, and payment instrument matching.

In some implementations of the invention, the currency orchestration instruction set further includes a foreign exchange module for initiating a foreign exchange process. In some implementations of the invention, the currency orchestration instruction set initiates an orchestration of currency conversion optimization process by communicating with the foreign exchange server 160. Additionally, or alternatively, the currency orchestration instruction set initiates a foreign exchange process with one or more rate provider server(s) 150.

The foreign exchange server 160 receives and processes foreign exchange rate requests that include offer look-up requests from the currency orchestration server 140. The foreign exchange server 160 may include a foreign exchange instruction set that performs a foreign exchange optimization protocol according to processes described herein (e.g., process 400 of FIG. 4 as described herein). In some implementations of the invention, in response to receiving a foreign exchange rate request from the currency orchestration server 140, the foreign exchange server 160 may determine a context of a transaction of the foreign exchange rate request based on a plurality of parameters associated with the foreign exchange rate request, where the foreign exchange rate request may include a first currency (e.g., USD), a second currency (e.g., EUR), and a transaction context information (e.g., a method of payment, i.e., credit card, an online stored value payment system, etc.). In some implementations of the invention, the foreign exchange server 160 obtains the information to determine the attributes or characteristics of the offer look-up request from data within the offer look-up request (e.g., metadata) such as localization of the foreign exchange rate request and attributes associated with the payment instrument (e.g., a type of credit card, country of origin, etc.). Additionally, or alternatively, the foreign exchange server 160 can access the information to determine the attributes or characteristics of the offer look-up request from the travel provider server 120 (e.g., access profile information of the customer, access merchant exchange requirement information, and the like). In some implementations of the invention, the plurality of parameters for a travel booking may include booking parameters. For example, the booking parameters may include a class or type of the ticket, origin and/or destination information, profile information of the passenger, and the like. Additionally, or alternatively, the plurality of parameters may include currency parameters and/or localization parameters. For example, some merchants may have particular margin requirements in different currencies and/or countries. Additionally, in some implementations, in response to receiving a foreign exchange rate request from the currency orchestration server 140, the foreign exchange server 160 can determine, based on a context of the transaction and attributes associated with the transaction context information, a converted offer associated with the proposed foreign exchange rate. For example, the foreign exchange server 160 may analyze the context of the transaction (e.g., localization of the foreign exchange rate request) and attributes associated with the transaction context information (e.g., a type of credit card, the country of origin for the travel booking, etc.). The foreign exchange server 160 may then generate a converted offer associated with the proposed foreign exchange rate. For example, a specific rounding algorithm may be applied to make sure that cents are not missed or dropped during the conversion.

Figure 2:
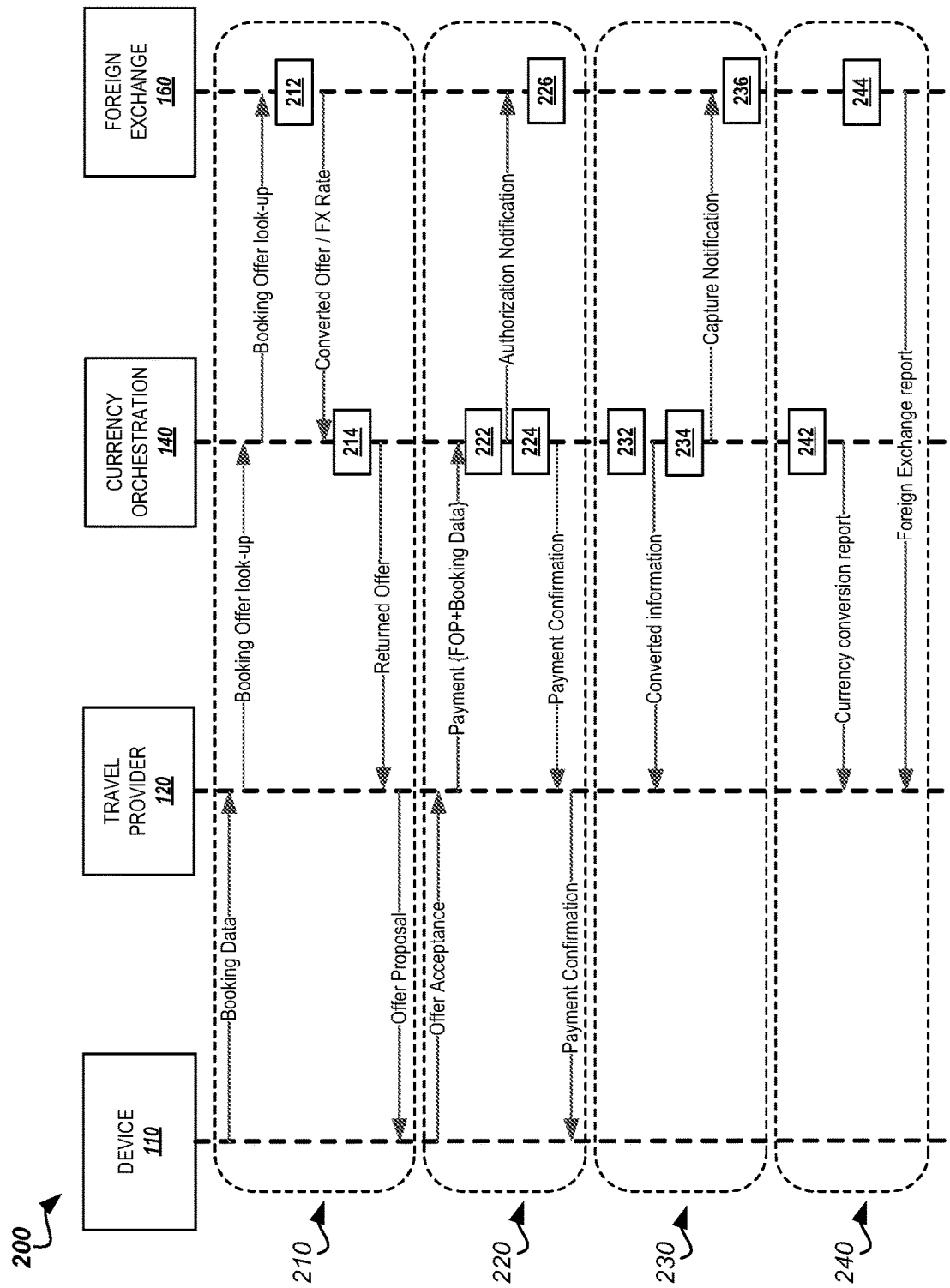
FIG. 2 illustrates an example routine in the form of a sequence diagram that may be performed by the environment shown in FIG. 1 as a procedure to facilitate currency conversion and foreign exchange processes for a travel booking, according to embodiments of the invention.

An example routine of implementing foreign exchange and currency conversion optimization processes, as illustrated in the environment of FIG. 1, is further discussed herein with reference to sequence diagram 200 of FIG. 2.

FIG. 2 illustrates an example routine in the form of a sequence diagram 200 that may be performed by the environment 100 shown in FIG. 1 as a procedure to facilitate currency conversion and foreign exchange processes for a travel booking, according to embodiments of the invention. FIG. 2 provides an exemplary routine that may be performed by the client device 110, the travel provider server(s) 120, the currency orchestration server 140, and/or the foreign exchange server(s) 160 consistent with some embodiments of the invention to process a currency conversion and a foreign exchange for a travel booking. However, it should be appreciated that processes described herein are in reference to a travel booking, but could be applied to any economic process that involves currency conversion and foreign exchange.

The sequence diagram 200 is initiated at an offer phase 210 of the currency conversion and foreign exchange process. The client device 110 via application 112 initiates the offer phase 210 by entering a travel request at a consumer device (client device 110) that initiates a payment website. The travel booking request is received by a travel provider server 120. In response, the travel provider server 120 determines that the travel booking associated with the booking request pertains to two different currencies (an exchange between a first currency associated with the user/traveler and a second currency with the merchant/travel provider). A booking offer look-up request is then sent to the currency orchestration server 140 from the travel provider server 120. The offer look-up request may include a first currency and a second currency. The offer look-up request may further include a transaction context information (e.g., a method of payment, i.e., credit card, an online stored value payment system, etc.). The offer look-up request may involve exchanging the first currency (e.g., USD) to the second currency (e.g., EUR), or vice versa. The offer look-up request may be received at the currency orchestration server 140 from a requestor (e.g., an entity that processes payments that may involve currency conversions).

The currency orchestration server 140 then provides a foreign exchange rate request including the offer look-up request to the foreign exchange server 160. In some implementations of the invention, in response to receiving the foreign exchange rate request from the currency orchestrator, at block 212, the foreign exchange server is configured to access a plurality of rate providers based on the foreign exchange rate request to determine the proposed foreign exchange rate. For example, accessing multiple foreign exchange providers, the offered foreign exchange rate is stored as the historical rate at the time of the offer in case a refund is warranted later. For example, the foreign exchange server 160 may access foreign exchange rates by accessing the rate lookup database(s) 155 associated with the one or more rate provider server(s) 150. Additionally, or alternatively, at block 212, the foreign exchange server 160 may determine attributes or characteristics of the offer look-up request associated with the travel merchant (e.g., travel provider server(s) 120) or with the customer purchasing the travel ticket (e.g., client device 110). In some implementations of the invention, the foreign exchange server 160 obtains the information to determine the attributes or characteristics of the offer look-up request from data within the offer look-up request (e.g., metadata) such as localization of the foreign exchange rate request and attributes associated with the transaction context information (e.g., a type of credit card, country of origin, etc.). Additionally, or alternatively, the foreign exchange server 160 can access the information to determine the attributes or characteristics of the offer look-up request from the travel provider server 120 (e.g., access profile information of the customer, access merchant exchange requirement information, and the like).

The foreign exchange server 160 then provides the converted offer and/or the proposed foreign exchange rate to the currency orchestration server 140. Then, at block 214, the currency orchestration server 140 provides a payment webpage including the converted offer to the travel provider server 120 (e.g., the merchant). The converted offer may be presented in a standard format based on formatting rules associated with the merchant. For example, a new ticket may be formatted in a standard format to disclose particular information to the customer. The travel provider server then provides the offer proposal to the consumer at client device 110 to complete the offer phase 210.

The sequence diagram 200 further includes a payment phase 220 of the currency conversion and foreign exchange process. The client device 110 via application 112 initiates the payment phase 220 by accepting the offer proposal with the proposed currency exchange rate via a merchant's payment website. The payment is received by the travel provider server 120. In response, the travel provider server 120 provides the payment information to the currency orchestration server 140. The payment information includes the form of payment a method of payment (e.g., a credit card, an online stored value payment system, etc.) and booking information associated with the travel booking (or any other type of product that a consumer may purchase from a merchant). At block 222, the currency orchestration server 140 processes the payment associated with the payment notification with a payment service provider (e.g., via one or more payment service provider server(s) 135 via the one or more payment platform server(s) 130).

In some implementations of the invention, the currency orchestration server 140 sends an authorization notification to the foreign exchange server 160. At block 226, the foreign exchange server 160, in response to receiving the authorization notification from the currency orchestration server 140 may determine pre-trading activities associated with the foreign exchange request for converting the first currency associated with the offer to the second currency. For example, the currency conversion optimization process described herein may allow a foreign exchange bank or other foreign exchange actor to better manage the risk(s) involved with foreign exchange, thus benefiting the foreign exchange requestor in achieving a better foreign exchange rate.

At block 224, the currency orchestration server 140, as part of processing the payment data, stores data associated with the converted offer in a sales record associated with the booking event (e.g., the purchase). For example, converted information may be stored in a sales record (e.g., a hot file) that is accessible by the merchant (e.g., the travel provider server 120).

The currency orchestration server 140, after processing the payment data (e.g., block 224), provides the payment confirmation (e.g., payment and ticketing information) to the travel provider server 120. In response, the travel provider server 120 sends a payment confirmation to the client device 110 (e.g., a travel ticket issuance).

The sequence diagram 200 further includes a capture phase 230 of the currency conversion and foreign exchange process. After the currency orchestration server 140 processes the payment data and provides the payment confirmation to the travel provider server 120, the currency orchestration server 140, at block 232, initiates a capture scheme and stores the data associated with the converted offer with a specific permission access scheme within a sales record. For example, a specific file structure may be utilized to store the information inside of the booking data (e.g., a payload embedded within the file with a header to determine the file information). The currency orchestration server 140 then provides the converted information after capture of payment to the travel provider server 120. Then, at block 234, the currency orchestration server 140 continues to process a payment by capturing the payment from a payment service provider in the converted currency at the foreign exchange rate as determined at the time of capture. In some implementations of the invention, the foreign exchange server 160 accesses a plurality of rate providers based on the foreign exchange rate request to determine a proposed foreign exchange rate based on the first currency and the second currency. For example, accessing multiple foreign exchange providers, the offered foreign exchange rate is stored as the historical rate at the time of the offer in case refund is warranted later. After processing the payment at the time of capture, the currency orchestration server 140 provides a capture notification to the foreign exchange server 160. At block 236, the foreign exchange server 160 in response to receiving the capture notification, determines a foreign exchange profit analysis for a merchant associated with the foreign exchange rate request. For example, at a capture time for pre-trading activities, the currency orchestration server 140 is moving the funds (e.g., payment service provider routing, converted currency, capture at ticket level, refund at the historical rate, and the like). In some implementations, the foreign exchange profit analysis is based on a ticket aggregation process, a trade netting process, and/or a trade optimization process. For example, determining for a travel merchant or payment service provider the profit that the merchant made at the point-of-sale level (e.g., ticket level) versus the profit that merchant is making because the merchant is using netting.

The sequence diagram 200 further includes a reporting phase 240 of the currency conversion and foreign exchange process. The currency orchestration server 140 initiates the reporting phase 240, at block 242, by generating a currency conversion report that includes the converted payment information at the ticketing level for the merchant. The currency orchestration server 140 then provides the currency conversion report to the travel provider server 120. Additionally, the reporting phase 240, at block 244, includes the process of the foreign exchange server 160 generating a foreign exchange report. The foreign exchange report may include the trading report associated with the date of the transaction, the ticket level profit calculation associated with the merchant, and/or the reconciliation calculation. The foreign exchange server 160 provides the foreign exchange report to the travel provider server 120 to complete the reporting phase 240 of the currency conversion and foreign exchange process as described herein.

Figure 3:
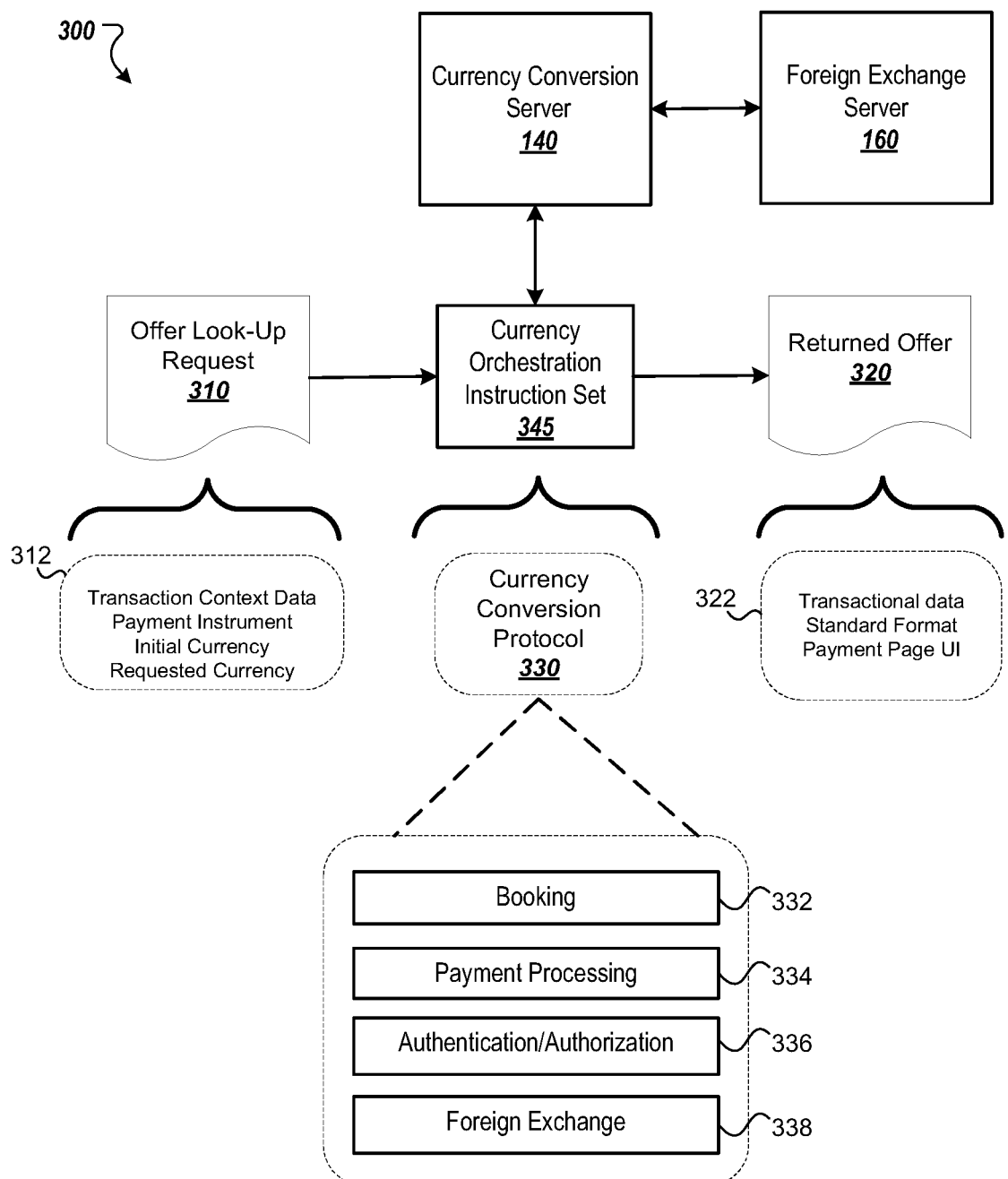
FIG. 3 illustrates example currency orchestration processes based on an offer look-up request, according to embodiments of the invention.

An example illustration of the actions of the currency orchestration server 140 utilizing the currency orchestration instruction set are further described herein with reference to FIG. 3.

FIG. 3 illustrates an example payment consolidation processes based on an offer look-up request, according to embodiments of the invention. In particular, FIG. 3 illustrates an example environment 300 for a currency orchestration implementation for determining a returned offer 320 based on receiving an offer look-up request 310. The objective for the currency orchestration instruction set is to enable merchants (e.g., travel merchants such as airlines) to manage the retail foreign exchange on their cross-currency payments in an industry applicable, fully automated manner. Additionally, the currency conversion process enables merchants to internalize the foreign exchange spread according to their own criteria. The currency conversion process further enables merchants to reconcile cross-currency payments in an automated way as the currency orchestrator can be configured to the standards of the applicable industry (e.g., modern touchpoints, frictionless flows, removing intermediaries, and the like) while the back-office processing remains unaffected. For example, the currency orchestration instruction set 345, stored on currency orchestration server 140, receives an offer look-up request 310 (e.g., from a travel provider server 120 via a client device 110). The offer look-up request 310 includes offer look-up request information 312 (e.g., transaction context data, a payment instrument, an initial currency, and a requested currency) that is associated with a travel reservation.

The currency orchestration instruction set 345 initiates a currency conversion protocol 330 to generate a returned offer 320 (e.g., a converted offer). The currency conversion protocol 330 includes, for example, a booking module 332, a payment processing module 334, an authentication/authorization module 336, and a foreign exchange module 338. For example, the booking module 332 may be configured to handle a booking process from the travel provider server 120. The payment processing module 334 may be configured to implement the payment processing scheme between a payment service provider (e.g., payment service provider servers(s) 135) via a payment platform server 130 and a client device 110. The authentication/authorization module 336 may be configured to verify a user making the payment on a client device 110 via a merchant webpage from a travel provider server 120. In an exemplary embodiment of the invention, payment data may be received from the client device 110 at the payment user interface (e.g., via a payment processor), and authentication may be performed of the client device based on the travel record identification by verifying authenticity information from a security database (e.g., payment database 132). Additionally, the authentication/authorization module 336 may perform sanity checks of the transaction context data (e.g., payment transaction information) and the travel record data as a part of an authentication protocol to determine if the information is consistent with information in the database(s). The authentication/authorization module 336 may further perform a fraudulent check to determine whether the transaction is fraudulent. The foreign exchange module 338 may be configured for initiating a foreign exchange process (e.g., initiating an orchestration of currency conversion optimization process by communicating with the foreign exchange server 160).

The returned offer 320 may include payment converted offer data 322 such as transactional data associated with the payment transaction, a standard formatting associated with the requesting merchant, and a transaction context data (e.g., payment transaction information) user interface associated with the requesting merchant.

Figure 4:
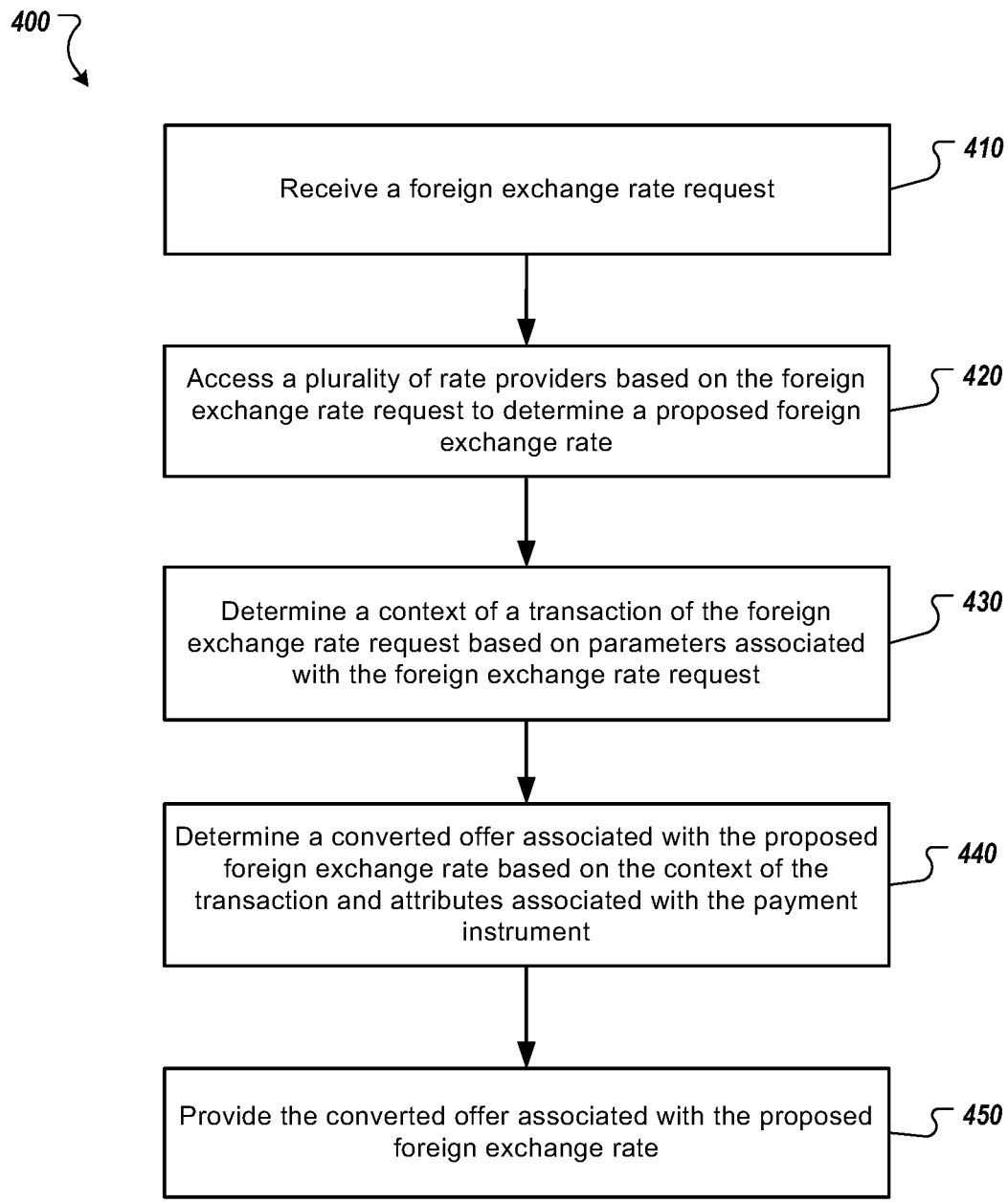
FIG. 4 is a flowchart of an example process for providing a proposed foreign exchange rate based on a foreign exchange rate request, according to embodiments of the invention.

FIG. 4 illustrates a flowchart of an example process 400 for providing a proposed foreign exchange rate based on a foreign exchange rate request, according to embodiments of the invention. Operations of the process 400 can be implemented, for example, by a system that includes one or more data processing apparatus, such as the foreign exchange server 160 of FIG. 1. The process 400 can also be implemented by instructions stored on computer storage medium, where execution of the instructions by a system that includes a data processing apparatus cause the data processing apparatus to perform the operations of the process 400.

The system receives a foreign exchange rate request including an offer look-up request, a first currency, and a second currency (410). The offer look-up request may include a transaction context information (e.g., a method of payment, i.e., credit card, an online stored value payment system, etc.). The offer look-up request may involve exchanging the first currency (e.g., USD) to the second currency (e.g., EUR), or vice versa. The offer look-up request may be received at the foreign exchange server 160 from a requestor (e.g., an entity that processes payments that may involve currency conversions). For example, as illustrated in the sequence diagram 200 of FIG. 2, the currency orchestration server 140 receives an offer look-up request from a merchant (e.g., travel provider server 120), and in response, the currency orchestration server 140 sends an offer look-up request to the foreign exchange server 160.

The system accesses a plurality of rate providers based on the foreign exchange rate request to determine a proposed foreign exchange rate based on the first currency and the second currency (420). For example, accessing multiple foreign exchange providers, the offered foreign exchange rate is stored as the historical rate at the time of the offer in case a refund is warranted later. For example, as illustrated in the sequence diagram 200 of FIG. 2, at block 212, the foreign exchange server 160 may access foreign exchange rates by accessing the rate lookup database(s) 155 associated with the one or more rate provider server(s) 150.

The system determines a context of a transaction of the foreign exchange rate request based on a plurality of parameters associated with the foreign exchange rate request (430). For example, as illustrated in the sequence diagram 200 of FIG. 2, at block 212, the foreign exchange server 160 may determine attributes or characteristics of the offer look-up request associated with the travel merchant (e.g., travel provider server(s) 120) or with the customer purchasing the travel ticket (e.g., client device 110). In some implementations of the invention, the foreign exchange server 160 obtains the information to determine the attributes or characteristics of the offer look-up request from data within the offer look-up request (e.g., metadata) such as localization of the foreign exchange rate request and attributes associated with the payment instrument (e.g., a type of credit card, country of origin, etc.). Additionally, or alternatively, the foreign exchange server 160 can access the information to determine the attributes or characteristics of the offer look-up request from the travel provider server 120 (e.g., access profile information of the customer, access merchant exchange requirement information, and the like).

In some implementations of the invention, the plurality of parameters are received from a merchant associated with the foreign exchange rate request or the plurality of parameters are received from the currency orchestrator. For example, the foreign exchange server 160 may have access to or have already obtained profile information from each associated merchant (e.g., travel provider server 120) that initiates a foreign exchange rate request and an associated offer look-up request.

In some implementations of the invention, the plurality of parameters for a travel booking may include booking parameters. For example, the booking parameters may include a class or type of the ticket, origin and/or destination information, profile information of the passenger, and the like. Additionally, or alternatively, the plurality of parameters may include currency parameters and/or localization parameters. For example, some merchants may have particular margin requirements in different currencies and/or countries. Additionally, in some implementations, transaction context information related to the industry being served may be included as the booking parameters (e.g., industry metadata).

The system determines a converted offer associated with the proposed foreign exchange rate based on the context of the transaction and attributes associated with the transaction context information (440). For example, the foreign exchange server 160 may analyze the context of the transaction (e.g., localization of the foreign exchange rate request) and attributes associated with the transaction context information (e.g., a type of credit card, the country of origin for the travel booking, etc.). The foreign exchange server 160 may then generate a converted offer associated with the proposed foreign exchange rate.

In some implementations of the invention, the process 400 further includes receiving, at the foreign exchange server, an authorization notification associated with an acceptance of the converted offer from a currency orchestrator, and in response to receiving the authorization notification, determining pre-trading activities associated with the foreign exchange request for converting the first currency associated with the offer to the second currency. For example, the currency conversion optimization process described herein may allow a foreign exchange bank or other foreign exchange actor to better manage the risk(s) involved with foreign exchange, thus benefiting the foreign exchange requestor in achieving a better foreign exchange rate.

In some implementations of the invention, a trade netting feature may be utilized, for example, to buy and sell in two different currencies (e.g., EUR/USD), and the foreign exchange server 160 can compensate between the two transactions. In an exemplary embodiment of the invention, determining the converted offer associated with the proposed foreign exchange rate includes receiving a first amount to be exchanged from the first currency to the second currency, receiving a second amount to be exchanged from the second currency to the first currency, when converted in the first currency said second amount being generally higher than the first amount, and determining a foreign exchange rate between a conversion from the second currency to the first currency for a third amount being a difference between second amount and the first amount. In some implementations of the invention, providing the converted offer associated with the proposed foreign exchange rate includes providing a pre-trading notification that includes the first foreign exchange amount and the second foreign exchange amount. For example, at an authorization time for pre-trading activities, the foreign exchange server 160 can identify the differences in exchanging and/or buying two different currencies (e.g., EUR/USD) and selling the two different currencies (e.g., EUR/USD). Thus, selecting the proposed foreign exchange rate for the converted offer calculates how much a merchant may be selling versus how much a merchant may be buying by utilizing the amount difference to know which side of the trade is bigger and determine the one trade to execute as opposed to both trades.

In some implementations of the invention, the process 400 further includes updating the converted offer associated with the proposed foreign exchange rate based on a rounding algorithm. For example, a specific rounding algorithm may be applied to make sure that cents are not missed or dropped during the conversion.

The system provides the converted offer associated with the proposed foreign exchange rate (450). For example, as illustrated in the sequence diagram 200 of FIG. 2, the foreign exchange server 160 provides the converted offer with the proposed foreign exchange rate to the currency orchestration server 140 (e.g., EUR to USD conversion).

In some implementations of the invention, the process 400 further includes receiving a capture notification and in response to receiving the capture notification, determining a foreign exchange profit analysis for a merchant associated with the foreign exchange rate request. For example, the currency orchestrator is moving the funds (e.g., payment service provider routing, converted currency, capture at ticket level, refund at the historical rate, and the like). In some implementations, the foreign exchange profit analysis is based on a ticket aggregation process, a trade netting process, and/or a trade optimization process. For example, determining for a travel merchant or payment service provider the profit that the merchant made at the point-of-sale level (e.g., ticket level) versus the profit that merchant is making because the merchant is using netting.

In some implementations of the invention, the process 400 further includes determining, based on the foreign exchange profit analysis, a trading report associated with a date of the transaction, a ticket level profit calculation associated with the merchant, and a reconciliation calculation. For example, easily reconcile with the settlement reported. In some implementations of the invention, the process 400 further includes providing a foreign exchange report to the merchant. For example, the foreign exchange report may include the trading report associated with the date of the transaction, the ticket level profit calculation associated with the merchant, and/or the reconciliation calculation. For example, as illustrated in the sequence diagram 200 of FIG. 2, at block 244, the foreign exchange server 160 provides the merchant (e.g., travel provider server 120) with the foreign exchange report, which may include the trading report associated with the date of the transaction, the ticket level profit calculation associated with the merchant, and/or the reconciliation calculation.

Figure 5:
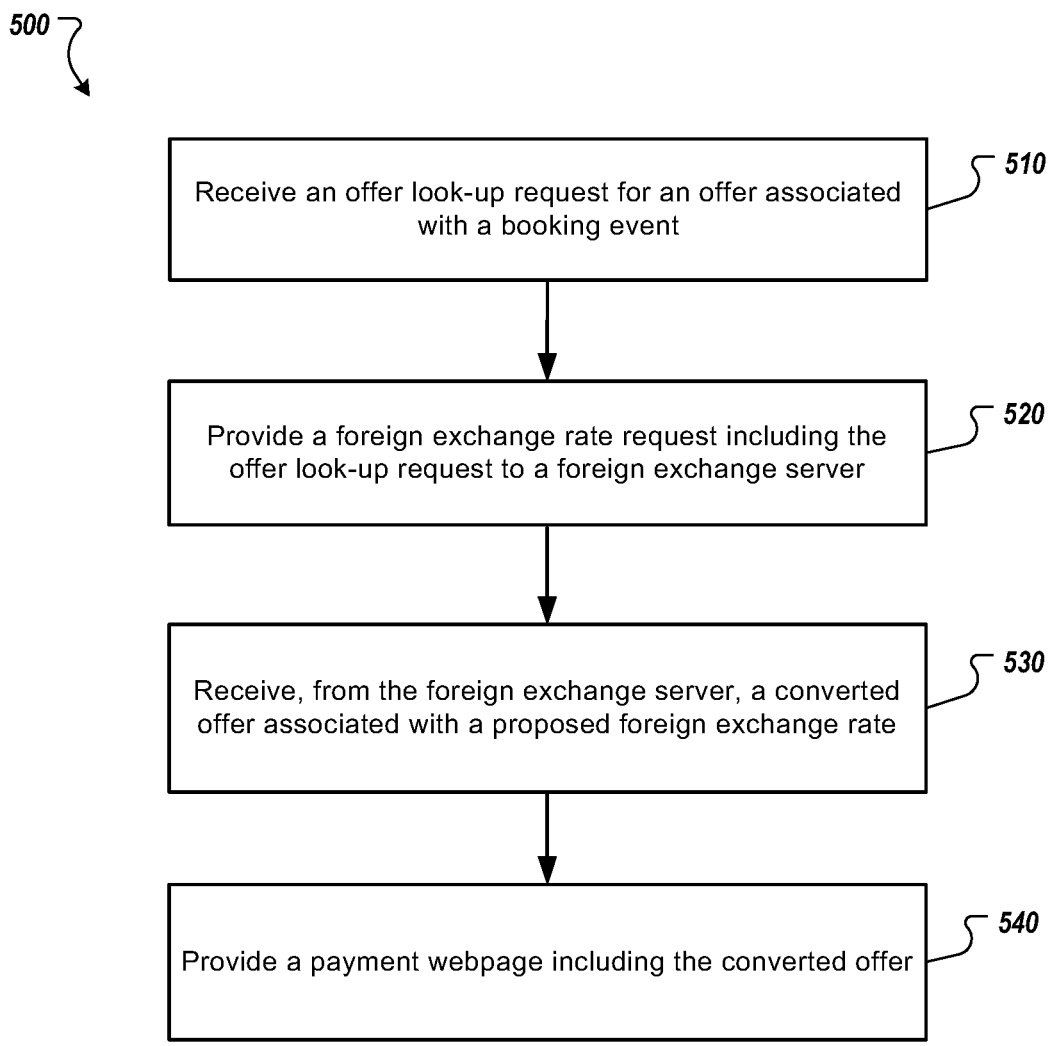
FIG. 5 is a flowchart of an example process for providing a converted offer based on an offer look-up request, according to embodiments of the invention.

FIG. 5 illustrates a flowchart of an example process 500 for providing a converted offer based on an offer look-up request, according to embodiments of the invention. Operations of the process 500 can be implemented, for example, by a system that includes one or more data processing apparatus, such as the currency orchestration server 140 of FIG. 1. The process 500 can also be implemented by instructions stored on computer storage medium, where execution of the instructions by a system that includes a data processing apparatus cause the data processing apparatus to perform the operations of the process 500.

The system receives an offer look-up request for an offer associated with a booking event (510). The offer look-up request may include a first currency and a second currency. The offer look-up request may further include a transaction context information (e.g., a method of payment, i.e., credit card, an online stored value payment system, etc.). The offer look-up request may involve exchanging the first currency (e.g., USD) to the second currency (e.g., EUR), or vice versa. The offer look-up request may be received at the currency orchestration server 140 from a requestor (e.g., an entity that processes payments that may involve currency conversions). For example, as illustrated in the sequence diagram 200 of FIG. 2, the travel provider server 120 (e.g., a merchant) receives a booking request that involves a foreign exchange from a customer (e.g., client device 110 via application 112), and in response, the travel provider server 120 sends an offer look-up request to the currency orchestration server 140.

The system provides a foreign exchange rate request including the offer look-up request to a foreign exchange server (520). For example, accessing multiple foreign exchange providers, the offered foreign exchange rate is stored as the historical rate at the time of the offer in case refund is warranted later. For example, as illustrated in the sequence diagram 200 of FIG. 2, the currency orchestration server 140 receives an offer look-up request from a merchant (e.g., travel provider server 120), and in response, the currency orchestration server 140 sends an offer look-up request to the foreign exchange server 160.

The system receives a converted offer associated with the proposed foreign exchange rate (530). For example, as illustrated in the sequence diagram 200 of FIG. 2, the foreign exchange server 160 provides the converted offer with the proposed foreign exchange rate to the currency orchestration server 140 (e.g., EUR to USD conversion).

The system provides a payment webpage including the converted offer (540). For example, as illustrated in the sequence diagram 200 of FIG. 2, the currency orchestration server 140 provides the converted offer (the "returned offer") which includes the proposed foreign exchange rate (e.g., EUR to USD conversion) to the requestor (e.g., travel provider server 120).

In some implementations of the invention, the converted offer may be presented in a standard format based on formatting rules associated with the merchant. For example, a new ticket (e.g., the returned offer) may be formatted in a standard format to disclose the merchant information to the customer so that the merchant does need to worry about how the ticket is displayed to the customer because the format is handled by the currency orchestration server 140. Thus, the travel provider server 120 can then provide the customer (e.g., client device 110) with a direct link for payment (e.g., "offer proposal") without first having to convert the formatting of the offer.

In some implementations of the invention, the process 500 further includes receiving, at the currency orchestrator from the merchant, a payment notification including payment transaction data that includes a transaction identification and a method of payment, wherein the payment notification is generated by the merchant based on an acceptance of the converted offer at a client device. In response to receiving the payment notification, the process 500 further includes processing a payment associated with the payment notification with a payment service provider, and providing, to the merchant, a payment confirmation and a ticket associated with the booking event. For example, as illustrated in the sequence diagram 200 of FIG. 2, at block 222, the currency orchestration server 140 processes a payment associated with the payment notification with a payment service provider.

In some implementations of the invention, processing the payment with the payment service provider includes accessing, via a fraud database, fraud verification information associated with the transaction identification, and verifying that payment transaction data associated with the payment notification is not fraudulent. In some implementations of the invention, performing the fraud check includes determining that a payment identification has not been already received by comparing the payment identification to other received payment identifications. The fraud check of the payment notification may include accessing, via a fraud database, fraud verification information associated with the travel record identification, and verifying that payment transaction data is not fraudulent.

In some implementations of the invention, processing the payment with the payment service provider includes determining that authorization of payment associated with payment transaction data associated with the payment notification is successful. In some implementations of the invention, processing the payment with the payment service provider includes determining that an authorization associated with the payment transaction data is valid based on an authorization time stamp. In some implementations of the invention, processing the payment with the payment service provider includes determining that there is not an attempted follow-up operation or a pending follow-up operation associated with the payment transaction data. In some implementations of the invention, processing the payment with the payment service provider includes determining that an amount and currency of payment associated with the payment transaction data is available. In some implementations of the invention, processing the payment with the payment service provider includes determining that a first payment instrument associated with the payment transaction data matches a second payment instrument associated with the travel record data. In some implementations of the invention, a validity check of the payment identification is performed as a part of an authentication protocol. The validity check may include determining that the payment identification has not been already received by comparing the payment identification to other received payment identifications.

In some implementations of the invention, processing the payment with the payment service provider includes storing data associated with the converted offer in a sales record associated with the booking event. For example, converted information may be stored in a sales record (e.g., a hot file) that is accessible by the merchant (e.g., the travel provider server 120). In some implementations of the invention, the data associated with the converted offer is stored with a specific permission access scheme within the sales record. For example, a specific file structure may be utilized to store the information inside of the booking data (e.g., a payload embedded within the file with a header to determine the file information).

In some implementations of the invention, processing the payment with the payment service provider includes capturing, during a capture time period, and the payment from the payment service provider based on a converted currency rate. The converted currency rate may be received from a foreign exchange rate provider at the capture time period. For example, as illustrated in the sequence diagram 200 of FIG. 2, at block 234, the currency orchestration server 140 continues to process a payment by capturing the payment from a payment service provider in the converted currency at the foreign exchange rate as determined at the time of capture.

In some implementations of the invention, the process 400 further includes storing the proposed foreign exchange rate as an historical rate associated with the transaction at an offer proposal time. For example, the currency orchestration server 140 stores the converted currency at the foreign exchange rate associated with the particular transaction in the conversion database 145. In some implementations of the invention, the process 400 further includes determining whether to issue a refund based on a comparison between the historical rate and another rate associated with the payment at a payment transaction time (e.g., a converted currency rate). For example, the currency orchestration server 140 compares the converted currency at the foreign exchange rate associated with the particular transaction with other related transactions stored in the conversion database 145.

In some implementations of the invention, in response to receiving the foreign exchange rate request from the currency orchestrator, the foreign exchange server is configured to access a plurality of rate providers based on the foreign exchange rate request to determine the proposed foreign exchange rate. For example, accessing multiple foreign exchange providers, the offered foreign exchange rate is stored as the historical rate at the time of the offer in case refund is warranted later. For example, as illustrated in the sequence diagram 200 of FIG. 2, at block 212, the foreign exchange server 160 may access foreign exchange rates by accessing the rate lookup database(s) 155 associated with the one or more rate provider server(s) 150.

In some implementations of the invention, in response to receiving the foreign exchange rate request from the currency orchestrator, the foreign exchange server is further configured to determine a context of a transaction of the foreign exchange rate request based on a plurality of parameters associated with the foreign exchange rate request. For example, as illustrated in the sequence diagram 200 of FIG. 2, at block 212, the foreign exchange server 160 may determine attributes or characteristics of the offer look-up request associated with the travel merchant (e.g., travel provider server(s) 120) or with the customer purchasing the travel ticket (e.g., client device 110). In some implementations of the invention, the foreign exchange server 160 obtains the information to determine the attributes or characteristics of the offer look-up request from data within the offer look-up request (e.g., metadata) such as localization of the foreign exchange rate request and attributes associated with the transaction context information (e.g., a type of credit card, country of origin, etc.). Additionally, or alternatively, the foreign exchange server 160 can access the information to determine the attributes or characteristics of the offer look-up request from the travel provider server 120 (e.g., access profile information of the customer, access merchant exchange requirement information, and the like). In some implementations of the invention, the plurality of parameters for a travel booking may include booking parameters. For example, the booking parameters may include a class or type of the ticket, origin and/or destination information, profile information of the passenger, and the like. Additionally, or alternatively, the plurality of parameters may include currency parameters and/or localization parameters. For example, some merchants may have particular margin requirements in different currencies and/or countries. Additionally, or alternatively, the plurality of parameters may include industry specific metadata or parameters (e.g., parameters associated with the travel industry such as geographic data associated with the travel location(s)).

In some implementations of the invention, in response to receiving the foreign exchange rate request from the currency orchestrator, the foreign exchange server is further configured to determine, based on the context of the transaction and attributes associated with the transaction context information, the converted offer associated with the proposed foreign exchange rate. For example, the foreign exchange server 160 may analyze the context of the transaction (e.g., localization of the foreign exchange rate request) and attributes associated with the transaction context information (e.g., a type of credit card, the country of origin for the travel booking, etc.). The foreign exchange server 160 may then generate a converted offer associated with the proposed foreign exchange rate. For example, a specific rounding algorithm may be applied to make sure that cents are not missed or dropped during the conversion.

In some implementations of the invention, the process 500 further includes providing, by the currency orchestrator, a capture notification to the foreign exchange server. In some implementations of the invention, the foreign exchange server, in response to receiving the capture notification, is further configured to determine a foreign exchange profit analysis for a merchant associated with the foreign exchange rate request, wherein the foreign exchange profit analysis is based on at least one of a ticket aggregation process, a trade netting process, and/or a trade optimization process. For example, determining for a travel merchant or payment service provider the profit that the merchant made at the point-of-sale level (e.g., ticket level) versus the profit that merchant is making because the merchant is using netting.

In some implementations of the invention, the foreign exchange server is further configured to determine, based on the foreign exchange profit analysis, a trading report associated with a date of the transaction, a ticket level profit calculation associated with the merchant, and a reconciliation calculation. For example, easily reconciled with the settlement reported. In some implementations of the invention, the process 400 further includes providing a foreign exchange report to the merchant. For example, the foreign exchange report may include the trading report associated with the date of the transaction, the ticket level profit calculation associated with the merchant, and/or the reconciliation calculation. For example, as illustrated in the sequence diagram 200 of FIG. 2, at block 244, the foreign exchange server 160 provides the merchant (e.g., travel provider server 120) with the foreign exchange report, which may include the trading report associated with the date of the transaction, the ticket level profit calculation associated with the merchant, and/or the reconciliation calculation.

Figure 6:
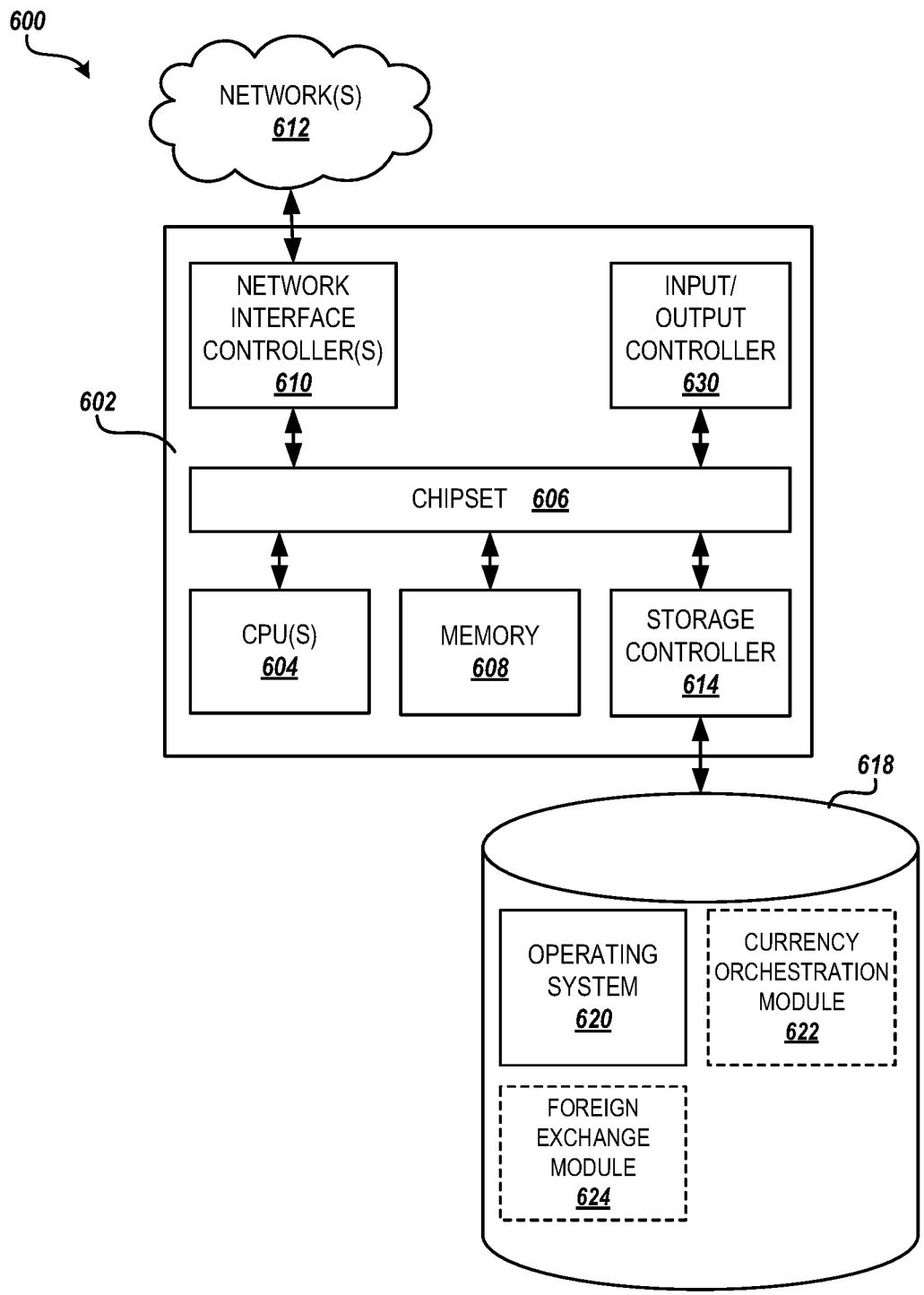
FIG. 6 is a block diagram showing an example computer architecture for a computer capable of executing the software components described herein, according to embodiments described herein.

FIG. 6 illustrates an example computer architecture 600 for a computer 602 capable of executing the software components described herein for the sending/receiving and processing of tasks. The computer architecture 600 (also referred to herein as a "server") shown in FIG. 6 illustrates a server computer, workstation, desktop computer, laptop, a server operating in a cloud environment, or other computing device, and may be utilized to execute any aspects of the software components presented herein described as executing on a host server, or other computing platform. The computer 602 preferably includes a baseboard, or "motherboard," which is a printed circuit board to which a multitude of components or devices may be connected by way of a system bus or other electrical communication paths. In one illustrative embodiment, one or more central processing units (CPUs) 604 operate in conjunction with a chipset 606. The CPUs 604 can be programmable processors that perform arithmetic and logical operations necessary for the operation of the computer 602.

The CPUs 604 preferably perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 606 provides an interface between the CPUs 604 and the remainder of the components and devices on the baseboard. The chipset 606 may provide an interface to a memory 608. The memory 608 may include a random-access memory (RAM) used as the main memory in the computer 602. The memory 608 may further include a computer-readable storage medium such as a read-only memory (ROM) or non-volatile RAM (NVRAM) for storing basic routines that that help to startup the computer 602 and to transfer information between the various components and devices. The ROM or NVRAM may also store other software components necessary for the operation of the computer 602 in accordance with the embodiments described herein.

According to various embodiments, the computer 602 may operate in a networked environment using logical connections to remote computing devices through one or more networks 612, a local-area network (LAN), a wide-area network (WAN), the Internet, or any other networking topology known in the art that connects the computer 602 to the devices and other remote computers. The chipset 606 includes functionality for providing network connectivity through one or more network interface controllers (NICs) 610, such as a gigabit Ethernet adapter. For example, the NIC 610 may be capable of connecting the computer 602 to other computer devices in the utility provider's systems. It should be appreciated that any number of NICs 610 may be present in the computer 602, connecting the computer to other types of networks and remote computer systems beyond those described herein.

The computer 602 may be connected to at least one mass storage device 618 that provides non-volatile storage for the computer 602. The mass storage device 618 may store system programs, application programs, other program modules, and data, which are described in greater detail herein. The mass storage device 618 may be connected to the computer 602 through a storage controller 614 connected to the chipset 606. The mass storage device 618 may consist of one or more physical storage units. The storage controller 614 may interface with the physical storage units through a serial attached SCSI (SAS) interface, a serial advanced technology attachment (SATA) interface, a fiber channel (FC) interface, or other standard interface for physically connecting and transferring data between computers and physical storage devices.

The computer 602 may store data on the mass storage device 618 by transforming the physical state of the physical storage units to reflect the information being stored. The specific transformation of physical state may depend on various factors, in different embodiments of the invention of this description. Examples of such factors may include, but are not limited to, the technology used to implement the physical storage units, whether the mass storage device 618 is characterized as primary or secondary storage, or the like. For example, the computer 602 may store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 may further read information from the mass storage device 618 by detecting the physical states or characteristics of one or more particular locations within the physical storage units.

The mass storage device 618 may store an operating system 620 utilized to control the operation of the computer 602. According to some embodiments, the operating system includes the LINUX operating system. According to another embodiment, the operating system includes the WINDOWS® SERVER operating system from MICROSOFT Corporation of Redmond, Wash. According to further embodiments, the operating system may include the UNIX or SOLARIS operating systems. It should be appreciated that other operating systems may also be utilized. The mass storage device 618 may store other system or application programs and data utilized by the computer 602, such as currency orchestration module 622 to perform the currency conversion processes, and a foreign exchange module 624 to perform the currency conversion processes, according to embodiments described herein. Other system or application programs and data utilized by the computer 602 may be provided as well (e.g., a security module, a payment processing module, a user interface module, etc.).

In some embodiments, the mass storage device 618 may be encoded with computer-executable instructions that, when loaded into the computer 602, transforms the computer 602 from being a general-purpose computing system into a special-purpose computer capable of implementing the embodiments described herein. These computer-executable instructions transform the computer 602 by specifying how the CPUs 604 transition between states, as described above. According to some embodiments, from the payment consolidation server(s) 160 perspective, the mass storage device 618 stores computer-executable instructions that, when executed by the computer 602, perform portions of the process 500, for implementing a payment consolidation system, as described herein. In further embodiments, the computer 602 may have access to other computer-readable storage medium in addition to or as an alternative to the mass storage device 618.

The computer 602 may also include an input/output controller 630 for receiving and processing input from a number of input devices, such as a keyboard, a mouse, a touchpad, a touch screen, an electronic stylus, or other type of input device. Similarly, the input/output controller 630 may provide output to a display device, such as a computer monitor, a flat-panel display, a digital projector, a printer, a plotter, or other type of output device. It will be appreciated that the computer 602 may not include all of the components shown in FIG. 6, may include other components that are not explicitly shown in FIG. 6, or may utilize an architecture completely different than that shown in FIG. 6.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically includes computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A computer-implemented method comprising:
   receiving, at a currency orchestrator server from a merchant device, an offer look-up request for an offer associated with a booking event, the offer look-up request comprising a first currency, a second currency, and a transaction context information, wherein the transaction context information includes booking parameters that correlate to an industry associated with the booking event;
   determining, at the currency orchestrator server, a context of a transaction of the offer look-up request based on the first currency, the second currency, and the booking parameters of the transaction context information;
   providing, by the currency orchestrator server, a foreign exchange rate request comprising the offer look-up request and the determined context of the transaction of the offer look-up request to a foreign exchange server, wherein the foreign exchange server is connected to a plurality of rate providers;
   in response to receiving the foreign exchange rate request from the currency orchestrator server:
   obtaining, by the foreign exchange server, information to determine attributes or characteristics of the offer look-up request from metadata within the offer look-up request, wherein the metadata comprises at least one of a market and a geographical location attached to the offer look-up request;
   determining, by the foreign exchange server, localization information associated with the foreign exchange rate request based on the metadata within the offer look-up request;
   accessing, by the foreign exchange server, the plurality of rate providers based on the foreign exchange rate request and the determined localization information associated with the foreign exchange rate request to determine the proposed foreign exchange rate;
   determining, by the foreign exchange server, a context of a transaction of the foreign exchange rate request based on a plurality of parameters associated with the foreign exchange rate request, the determined context of the transaction of the offer look-up request, and the determined localization information associated with the foreign exchange rate request;
   selecting, by the foreign exchange server, a rate provider from among the plurality of rate providers based on the determined context of the transaction of the offer look-up request, and the determined localization information associated with the foreign exchange rate request; and
   determining, by the foreign exchange server and based on the context of the transaction of the foreign exchange rate request, attributes associated with the transaction context information, and the determined localization information associated with the foreign exchange rate request, a converted offer associated with the proposed foreign exchange rate of the selected rate provider;
   receiving, at the currency orchestrator server from the foreign exchange server, the converted offer associated with a proposed foreign exchange rate from the selected rate provider;
   providing, to the merchant device by the currency orchestrator server, a payment webpage comprising the converted offer, wherein the converted offer is presented in a standard format based on formatting rules associated with a merchant associated with the merchant device;
   receiving, at the currency orchestrator server from the merchant device, a payment notification comprising payment transaction data that includes a transaction identification and a method of payment for the converted offer, wherein the payment notification is generated by the merchant device based on an acceptance of the converted offer at a client device;
   initiating a capture scheme that stores data associated with the converted offer with a specific permission access scheme within a sales record associated with the booking event, wherein the specific permission access scheme comprises a payload embedded within a file associated with the sales record that includes a header to determine file information; and
   processing a payment associated with the payment notification with a payment service provider, wherein processing the payment associated with the payment notification with the payment service provider comprises:
   accessing, via a fraud database, fraud verification information associated with the transaction identification;
   verifying that the payment transaction data associated with the payment notification is not fraudulent; and
   determining that an authorization associated with the payment transaction data is valid based on an authorization time stamp.

2. The method of claim 1, further comprising:
   providing, to the merchant device, a payment confirmation and a ticket associated with the booking event.

3. The method of claim 1, wherein processing the payment associated with the payment notification with the payment service provider further comprises:
   determining that the authorization of payment associated with the payment transaction data is successful;
   determining that there is not an attempted follow-up operation or a pending follow-up operation associated with the payment transaction data;
   determining that an amount of payment and a currency of payment associated with the payment transaction data are available; or
   determining that a first payment instrument associated with the payment transaction data matches a second payment instrument associated with a travel record data.

4. The method of claim 1, wherein processing the payment associated with the payment notification with the payment service provider further comprises:
   storing data associated with the converted offer in a sales record associated with the booking event.

5. The method of claim 1, wherein processing the payment associated with the payment notification with the payment service provider further comprises:
  capturing, during a capture time period, the payment from the payment service provider based on a converted currency rate, wherein the converted currency rate is received from a foreign exchange rate provider at the capture time period.

6. The method of claim 5, further comprising:
  storing the proposed foreign exchange rate as an historical rate associated with a transaction at an offer proposal time; and
  determining whether to issue a refund based on a comparison between the historical rate and another rate associated with the payment at a payment transaction time.

7. The method of claim 1, further comprising:
  providing, by the currency orchestrator server, a capture notification to the foreign exchange server, wherein the foreign exchange server, in response to receiving the capture notification, is further configured to:
  determine a foreign exchange profit analysis for the merchant associated with the foreign exchange rate request, wherein the foreign exchange profit analysis is based on a ticket aggregation process.

8. The method of claim 7, wherein the ticket aggregation process is based on received notifications, and each notification is referenced using a ticket number, a booking reference, and a payment reference.

9. The method of claim 1, further comprising:
  providing, by the currency orchestrator server, a capture notification to the foreign exchange server, wherein the foreign exchange server, in response to receiving the capture notification, is further configured to:
  determine a foreign exchange profit analysis for the merchant associated with the foreign exchange rate request, wherein the foreign exchange profit analysis is based on:
    a ticket aggregation process,
    a trade netting process,
    a trade optimization process, or
    a combination thereof.

10. The method of claim 9, wherein the foreign exchange server is further configured to determine, based on the foreign exchange profit analysis, a trading report associated with a date of the transaction, a ticket level profit calculation associated with the merchant, and a reconciliation calculation.

11. The method of claim 10, wherein the foreign exchange server is further configured to provide a foreign exchange report to the merchant device, and the foreign exchange report includes the trading report associated with the date of the transaction, the ticket level profit calculation associated with the merchant, and the reconciliation calculation.

12. The method of claim 1, wherein the plurality of parameters are received from the merchant device associated with the foreign exchange rate request or the currency orchestrator server.

13. The method of claim 1, wherein the plurality of parameters associated with the foreign exchange rate request comprise booking parameters.

14. The method of claim 1, wherein the plurality of parameters associated with the foreign exchange rate request comprise currency parameters and/or localization parameters.

15. A computing apparatus comprising:
  one or more processors;
  at least one memory device coupled with the one or more processors; and
  a data communications interface operably associated with the one or more processors,
  wherein the at least one memory device contains a plurality of program instructions that, when executed by the one or more processors, cause the computing apparatus to:
  receive, at a currency orchestrator server from a merchant device, an offer look-up request for an offer associated with a booking event, the offer look-up request comprising a first currency, a second currency, and a transaction context information, wherein the transaction context information includes booking parameters that correlate to an industry associated with the booking event;
  determine, by the currency orchestrator server, a context of a transaction of the offer look-up request based on the first currency, the second currency, and the booking parameters of the transaction context information;
  provide, by the currency orchestrator server, a foreign exchange rate request comprising the offer look-up request and the determined context of the transaction of the offer look-up request to a foreign exchange server, wherein the foreign exchange server is connected to a plurality of rate providers;
  in response to receiving the foreign exchange rate request from the currency orchestrator server:
  obtain, by the foreign exchange server, information to determine attributes or characteristics of the offer look-up request from metadata within the offer look-up request, wherein the metadata comprises at least one of a market and a geographical location attached to the offer look-up request;
  determine, by the foreign exchange server, localization information associated with the foreign exchange rate request based on the metadata within the offer look-up request;
  access, by the foreign exchange server, the plurality of rate providers based on the foreign exchange rate request and the determined localization information associated with the foreign exchange rate request to determine the proposed foreign exchange rate;
  determine, by the foreign exchange server, a context of a transaction of the foreign exchange rate request based on a plurality of parameters associated with the foreign exchange rate request, the determined context of the transaction of the offer look-up request, and the determined localization information associated with the foreign exchange rate request;
  select, by the foreign exchange server, a rate provider from among the plurality of rate providers based on the determined context of the transaction of the offer look-up request, and the determined localization information associated with the foreign exchange rate request; and
  determine, by the foreign exchange server and based on the context of the transaction of the foreign exchange rate request and attributes associated with the transaction context information, and the determined localization information associated with the foreign exchange rate request, a converted offer associated with the proposed foreign exchange rate of the selected rate provider;

receive, at the currency orchestrator server from the foreign exchange server, the converted offer associated with a proposed foreign exchange rate from the selected rate provider;

provide, to the merchant by the currency orchestrator server, a payment webpage comprising the converted offer, wherein the converted offer is presented in a standard format based on formatting rules associated with a merchant associated with the merchant device;

receive, at the currency orchestrator server from the merchant device, a payment notification comprising payment transaction data that includes a transaction identification and a method of payment for the converted offer, wherein the payment notification is generated by the merchant device based on an acceptance of the converted offer at a client device;

process a payment associated with the payment notification with a payment service provider; and initiate a capture scheme that stores data associated with the converted offer with a specific permission access scheme within a sales record associated with the booking event, wherein the specific permission access scheme comprises a payload embedded within a file associated with the sales record that includes a header to determine file information; and process a payment associated with the payment notification with a payment service provider, wherein process the payment with the payment notification with the payment service provider comprises:

access, via a fraud database, fraud verification information associated with the transaction identification;

verify that the payment transaction data associated with the payment notification is not fraudulent; and determine that an authorization associated with the payment transaction data is valid based on an authorization time stamp.

16. The computing apparatus of claim 15, wherein the plurality of program instructions, when executed by the one or more processors, further cause the computing apparatus to:

provide, to the merchant, a payment confirmation and a ticket associated with the booking event.

17. The computing apparatus of claim 15, wherein process the payment associated with the payment notification with the payment service provider further comprises:

determine that the authorization of payment associated with the payment transaction data is successful;

determine that there is not an attempted follow-up operation or a pending follow-up operation associated with the payment transaction data;

determine that an amount of payment and a currency of payment associated with the payment transaction data are available; or determine that a first payment instrument associated with the payment transaction data matches a second payment instrument associated with a travel record data.

18. A non-transitory computer storage medium encoded with a computer program, the computer program comprising a plurality of program instructions that when executed by one or more processors cause the one or more processors to perform operations comprising:

receive, at a currency orchestrator server from a merchant device, an offer look-up request for an offer associated with a booking event, the offer look-up request comprising a first currency, a second currency, and a transaction context information, wherein the transaction context information includes booking parameters that correlate to an industry associated with the booking event;

determine, by the currency orchestrator server, a context of a transaction of the offer look-up request based on the first currency, the second currency, and the booking parameters of the transaction context information;

provide, by the currency orchestrator server, a foreign exchange rate request comprising the offer look-up request and the determined context of the transaction of the offer look-up request to a foreign exchange server, wherein the foreign exchange server is connected to a plurality of rate providers;

in response to receiving the foreign exchange rate request from the currency orchestrator server:

obtain, by the foreign exchange server, information to determine attributes or characteristics of the offer look-up request from metadata within the offer look-up request, wherein the metadata comprises at least one of a market and a geographical location attached to the offer look-up request;

determine, by the foreign exchange server, localization information associated with the foreign exchange rate request based on the metadata within the offer look-up request;

access, by the foreign exchange server, the plurality of rate providers based on the foreign exchange rate request and the determined localization information associated with the foreign exchange rate request to determine the proposed foreign exchange rate;

determine, by the foreign exchange server, a context of a transaction of the foreign exchange rate request based on a plurality of parameters associated with the foreign exchange rate request, the determined context of the transaction of the offer look-up request, and the determined localization information associated with the foreign exchange rate request;

select, by the foreign exchange server, a rate provider from among the plurality of rate providers based on the determined context of the transaction of the offer look-up request, and the determined localization information associated with the foreign exchange rate request; and determine, by the foreign exchange server and based on the context of the transaction of the foreign exchange rate request and attributes associated with the transaction context information, and the determined localization information associated with the foreign exchange rate request, a converted offer associated with the proposed foreign exchange rate of the selected rate provider;

receive, at the currency orchestrator server from the foreign exchange server, the converted offer associated with a proposed foreign exchange rate from the selected rate provider;

provide, to the merchant device by the currency orchestrator server, a payment webpage comprising the converted offer, wherein the converted offer is presented in a standard format based on formatting rules associated with a merchant associated with the merchant device;

receive, at the currency orchestrator server from the merchant device, a payment notification comprising payment transaction data that includes a transaction identification and a method of payment for the converted offer, wherein the payment notification is generated by the merchant device based on an acceptance of the converted offer at a client device;

initiate a capture scheme that stores data associated with the converted offer with a specific permission access scheme within a sales record associated with the booking event, wherein the specific permission access scheme comprises a payload embedded within a file associated with the sales record that includes a header to determine file information; and process a payment associated with the payment notification with a payment service provider, wherein process the payment with the payment notification with the payment service provider comprises:

access, via a fraud database, fraud verification information associated with the transaction identification;

verify that the payment transaction data associated with the payment notification is not fraudulent; and determine that an authorization associated with the payment transaction data is valid based on an authorization time stamp.

\* \* \* \* \*